United States Patent [19]

Bayer

[11] Patent Number: 4,886,379
[45] Date of Patent: Dec. 12, 1989

[54] CAGE FOR BALL BEARINGS

[75] Inventor: Oswald Bayer, Aidhausen, Fed. Rep. of Germany

[73] Assignee: FAG Kugelfischer Georg Schafer (KGaA), Fed. Rep. of Germany

[21] Appl. No.: 108,096

[22] Filed: Oct. 13, 1987

[30] Foreign Application Priority Data

Nov. 27, 1986 [DE] Fed. Rep. of Germany ....... 3640663

[51] Int. Cl.⁴ ............................................. F16C 33/42
[52] U.S. Cl. .................................. 384/523; 384/530; 384/533
[58] Field of Search .......................... 384/523, 526–534

[56] References Cited

U.S. PATENT DOCUMENTS

| 937,153 | 10/1909 | Karcher | 384/533 |
|---|---|---|---|
| 1,192,470 | 7/1916 | Starin | 384/533 |
| 1,365,426 | 1/1921 | Spanitz . | |
| 1,366,312 | 1/1921 | Danielsson | 384/526 |
| 1,463,299 | 7/1923 | Staake | 384/530 |
| 1,665,448 | 4/1928 | Dake | 384/533 |
| 1,825,365 | 9/1931 | Runge | 384/523 |
| 2,706,669 | 4/1955 | Lasto | 384/530 |
| 3,502,376 | 3/1970 | Potter | 384/523 |

FOREIGN PATENT DOCUMENTS

| 925203 | 3/1955 | Fed. Rep. of Germany | 384/529 |
|---|---|---|---|
| 546118 | 2/1928 | Italy | 384/531 |
| 47980 | 11/1920 | Sweden | 384/533 |
| 303871 | 11/1929 | United Kingdom . | |
| 927377 | 5/1963 | United Kingdom . | |
| 1391360 | 4/1975 | United Kingdom | 384/523 |
| 2018913A | 10/1979 | United Kingdom . | |
| 2156912A | 10/1985 | United Kingdom . | |

Primary Examiner—Thomas R. Hannon
Attorney, Agent, or Firm—Ostrolenk, Faber, Gerb & Soffen

[57] ABSTRACT

A cage for a ball bearing comprised of two generally ridge-shaped ring parts, the respective axially projecting ridges of which are cooperatively placed to define respective pockets for the balls. The plane of separation between the two ring parts is shifted axially off the center and toward one of the ring parts. In the ring part with the axially larger ridges, the circumferentially opposite ends of the respective ridges are at least nearly flat, in the plane through the centers of the balls. The axially deepest surfaces of the ridges are also at least nearly flat, at the axially opposite sides of the cage, which is generally in the respective axial plane through the center of each ball. This prevents jamming of the balls, even in the case of defective manufacture or defective connection of the ring parts.

4 Claims, 1 Drawing Sheet

CAGE FOR BALL BEARINGS

BACKGROUND OF THE INVENTION

The present invention refers to a ball bearing, and particularly to a cage or separator for the bearing and more particularly to a cage or separator made of interconnected, ridge shaped ring parts.

Federal Republic of Germany Patent No. 925 203 discloses such a cage. It is comprised of two ring parts, which are formed of sheet metal, with pocket sections for the balls formed on each ring part. The two ring parts are connected by riveting. However, they can also be connected by welding or by the development on the ring parts of holding sections which, after being bent over, grip around the other ring part. Particularly for small ball bearings, the manufacture of these shaped and stamped parts cannot be effected with the required accuracy at acceptable expense. The ring parts can become readily twisted with respect to each other in the circumferential direction due to inaccuracies in manufacture. The balls may thereby become jammed in the pockets. Higher friction then results, which may lead to rapid failure of the bearing. Furthermore, protruding edges on the cage parts can also cause damage to the balls.

SUMMARY OF THE INVENTION

The object of the present invention is to improve the foregoing cage for a ball bearing to neutralize the effects of the circumferential shifts of the cage ring parts with respect to each other, which are caused upon manufacture and assembly, and the effects of other inaccuracies. As a result, stress-free guidance of the balls in the pockets is made possible and damage to the balls is prevented.

The cage of the invention is used in a ball bearing. The cage is comprised of two ridge-shaped ring parts which are connected to each other. The ridge-shaped parts include a plurality of axially projecting ridges arranged around the ring parts, and cooperating ridges on both ring parts together define pocket sections, each of which receives a respective ball. The invention is concerned with preventing jamming of the balls in the case of defective manufacture or defective connection of the ring parts.

First, the place of separation between the ring parts, instead of being axially in the center of the cage, is shifted axially toward one of the ring parts and that place is preferably along a plane. Secondly, those pocket sections of the larger ring part, which are at the circumferentially opposite ends of each of the ridges of the larger ring part, have a flat or almost flat ball stop surface, at least in a region lying in a plane transverse to the axis of the bearing and defined by the center points of the balls. Third, the axially outward surfaces of opposite ridges or pocket sections, in the respective plane along the axis of the bearing and defined by the center point of the ball in both of the ring parts, may be flat or practically flat ball stop surfaces.

Because the plane of separation between the two ring parts is shifted axially of the bearing toward one side and because of the play of the balls in the respective pockets, a small circumferential shift of the two ring parts with respect to each other does not have negative consequences. This situation is further substantially favored by the fact that the pockets have flat or practically flat ball stop surfaces, at least in a region which lies in the plane defined by the center points of the balls. As a result, the distance between the ball surface and the cage edge of the small ring part becomes even greater, so that circumferential twisting of the two ring parts with respect to each other can occur without the balls being clamped or damaged.

In accordance with a preferred embodiment, all axially outward pocket surface sections also have flat or nearly flat ball stop surfaces. In this way, resting of the balls free of constraining forces is also assured in these regions.

BRIEF DESCRIPTION OF THE DRAWINGS

Other objects and features of the invention are explained with reference to the accompanying drawings in which.

DESCRIPTION OF A PREFERRED EMBODIMENT

Figure 2:
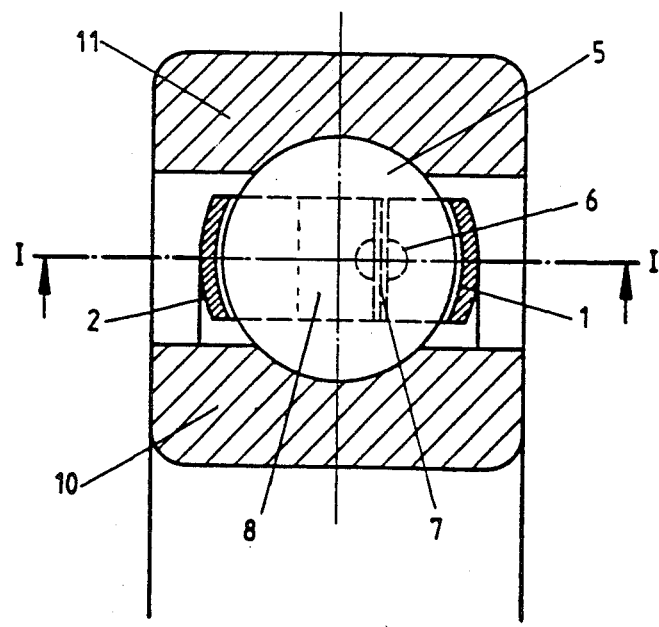
FIG. 2 is a partial cross-section through a ball bearing having a cage in accordance with FIG. 1.

The present invention is particularly useful in a ball bearing which, as is conventional, as shown in FIG. 2, comprises an outer ring 11 with an inwardly facing raceway, an inner ring 10 with an outwardly facing raceway and an array of balls 5 which roll between the outer and inner ring raceways. A cage or separator is used in such a bearing to space apart and guide the balls as they roll around the ring raceways.

Figure 1:
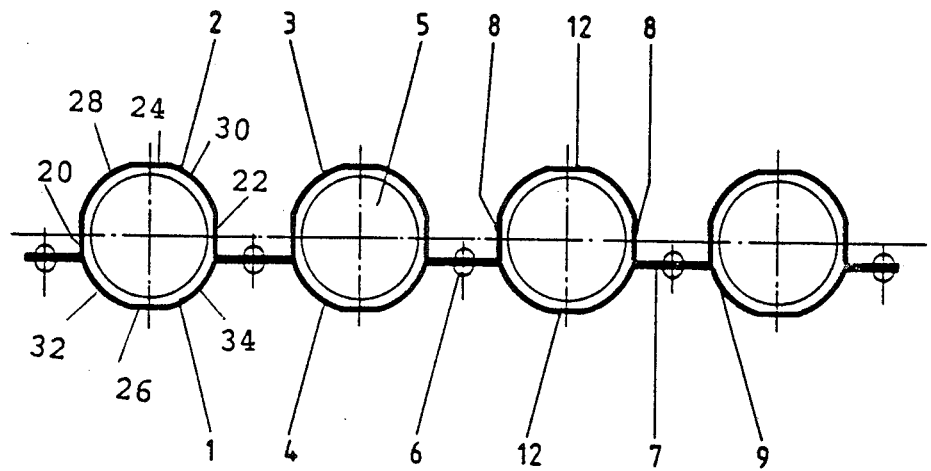
FIG. 1 is a sectional view of several pockets of a cage in accordance with the invention, the view being in the direction indicated as I in FIG. 2.

FIG. 1 shows a developed view of a part of a sheet metal cage or separator for the balls of a ball bearing. The cage is comprised of two ring parts 1 and 2. Each ring part has respective circumferentially correspondingly positioned, axially outwardly projecting ridges or pocket sections 3 and 4 formed thereon to receive the balls 5. After the introduction of the balls 5, the ring parts 1 and 2 are connected to each other by rivets 6 with the respective pocket sections circumferentially placed so that two sections define a pocket. The resulting pockets guide the balls at the desired distance apart for movement around the bearing rings.

In order for the purpose of the invention to be achieved, the place of separation 7 between the two ring parts 1 and 2, which is transverse to the axis of the bearing, is shifted axially of the bearing into a plane located toward the front side of the ring part 1. The pocket sections 8 of the larger ridge ring part 2, which sections 8 are the ones arranged in the circumferential direction, have flat ball stop surfaces 20 and 22. Those pocket sections are at the circumferential ends of each pocket and are aligned generally along the centers of the balls. In this way, jamming of the balls 5 or damage to them is prevented in the event of minor errors in manufacture and/or assembly of the ring parts. If the ring parts 1 and 2 are, for example, mounted somewhat staggered in the circumferential direction with respect to each other, as can easily occur in the case of small ball bearings, then the edge 9 would then protrude, in a manner not shown in the drawing, with respect to the flat surface 8. This determines the position of the ball 5. The edge 9 will still not come into contact with the ball 5 since a relatively large clearance is present between the edge 9 and the ball 5.

FIG. 2 shows a ball bearing comprised of the inner ring 10 and the outer ring 11, between which the cage of FIG. 1 containing the balls 5 is installed. It can be noted here how the plane of separation 7 is axially shifted toward the ring part 1.

In order that a constraint-free application of the balls 5 is obtained also along the axial guide surface of the cage, all axial pocket sections 12, which are at the axially opposite, axially most outward sides of the pockets, are provided with flat ball stop surfaces, namely flat ball stop surface 24 on the larger ring part 2 and flat ball stop surface 26 on the smaller ring part 1. These pocket sections 12 for each pocket are also aligned across the center of the respective ball.

Furthermore, as seen in FIG. 1, the ring parts 1 and 2 have, at the location thereof other than where the flat ball stop surfaces are located, arcuate inner surfaces, including arcuate inner surfaces 28 and 30, on the larger ring part 2, and arcuate surfaces 32 and 354 on the smaller ring part 1. As is plainly apparent from FIG. 1, the dimensions (lengths) of the flat ball stop surfaces, along a cross-section passing through the ring parts 1 and 2, is comparable in size to the corresponding length of the arcuate inner surfaces.

As a result of this construction and since the arcuate inner surfaces join the flat ball stop surfaces, the arcuate surfaces lie beyond the reach of the ball bearings. This produces a gap between the ring parts and the balls for more efficient circulation and distribution of lubricant in the ball bearing.

Instead of a sheet-metal cage, a solid cage can also be installed. In that case, the same problems arise, which can also be eliminated by the same measures, that is by shifting the plane of separation, or the line on which connections between pockets is formed, toward one axial side of the bearing.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A cage for a ball bearing, the cage comprising first and second ring parts which are connected to each other to define a complete ring for extending around the ball bearing, the first and second ring parts are each ridge shaped, each ring part having axially projecting ridges defined in an array spaced circumferentially around the ring part, with each ridge defining an open pocket section, and the ridges being so placed around the ring parts that with the ring parts connected to each other, a respective ridge on each ring part which defines a pocket section cooperates with a respective ridge on the other ring part which defines a pocket section to together define a pocket in which a ball of the bearing may be received;

the ring parts being shaped so that their place of separation, where the ring parts are connected together, is shifted axially toward one of the ring parts, so that the ridges of the second ring part axially project taller than the ridges of the first ring part; the axially taller ridges of the second ring parts are shaped so that they have first, substantially flat ball stop surfaces at both circumferentially opposite ends of the ridge; the first flat ball stop surfaces lie generally in a transverse plane defined by the centers of the balls held in the pocket sections; the ridges of both of the ring parts are shaped so that, at the axially outward end of each of the ridges, the pocket sections have second, substantially flat ball stop surfaces at the axially deepest parts of the ridges, whereby there are respective second at least axially flat ball stop surfaces at the axially opposite sides of the resulting pocket sections, and the first and second ring parts having respective arcuate inner surfaces, the inner surfaces of the second ring part extending between its first and second flat ball stop surfaces and the inner surfaces of the first ring part being located other than at said second flat surface, the circumferential lengths of the first and second substantially float surfaces being comparable to the corresponding lengths of the arcutate inner surfaces.

2. The cage of claim 1, wherein the place of separation between the ring parts is in a common plane around the cage transverse to the axis of the bearing.

3. The cage of claim 1, wherein the first and second flat ball stop surfaces on the axially opposite sides of the pocket sections each generally lie in a plane defined by the center points of the respective balls in each pocket.

4. The cage of claim 3, wherein each ring part is comprised of a ring of sheet metal bent into the shape of the respective ring part.

* * * * *